(12) United States Patent
Ki et al.

(10) Patent No.: US 9,678,966 B2
(45) Date of Patent: *Jun. 13, 2017

(54) SWAT COMMAND AND API FOR ATOMIC SWAP AND TRIM OF LBAS

(71) Applicant: Samsung Electronics Co., Ltd., Gyeonggi-do (KR)

(72) Inventors: Yang Seok Ki, Palo Alto, CA (US); Sang Won Lee, Menlo Park, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 37 days.

This patent is subject to a terminal disclaimer.

(21) Appl. No.: 14/282,358

(22) Filed: May 20, 2014

(65) Prior Publication Data

US 2015/0134621 A1    May 14, 2015

Related U.S. Application Data

(60) Provisional application No. 61/902,092, filed on Nov. 8, 2013.

(51) Int. Cl.
*G06F 12/00* (2006.01)
*G06F 17/30* (2006.01)
*G06F 3/06* (2006.01)

(52) U.S. Cl.
CPC ........ *G06F 17/30115* (2013.01); *G06F 3/061* (2013.01); *G06F 3/0638* (2013.01); *G06F 3/0643* (2013.01); *G06F 3/0676* (2013.01)

(58) Field of Classification Search
CPC ............... G06F 2212/152; G06F 12/10; G06F 2212/7201; G06F 12/1009
See application file for complete search history.

(56) References Cited

U.S. PATENT DOCUMENTS

| 6,366,933 | B1 | 4/2002 | Ball | |
|---|---|---|---|---|
| 6,895,490 | B1 * | 5/2005 | Moore | G06F 3/0607 365/230.03 |
| 7,821,896 | B2 * | 10/2010 | Gotoh | G06F 3/0626 369/53.24 |
| 8,495,085 | B2 | 7/2013 | Cai | |

(Continued)

OTHER PUBLICATIONS

Wong, et al., "Managing and Querying Multi-Version XML Data with Update Logging," DocEng'02, Nov. 8-9, 2002, McLean, Virginia, ACM 1-58113-594-7/02/0011.

*Primary Examiner* — Ann J Lo
*Assistant Examiner* — Eric Loonan
(74) *Attorney, Agent, or Firm* — Convergent Law Group LLP

(57) ABSTRACT

Exemplary embodiments provide access to an updated file performed by a computer having at least one processor, wherein responsive to an application receiving an update comprising modified content of an old file, a new file is created into which the modified content is copied, while access to the old file is maintained, wherein old file logical block addresses (LBAs) are mapped to old file physical block addresses (PBAs), and new file LBAs are mapped to new file PBAs, the method, comprising: atomically swapping the mapping of the old file LBAs from the old file PBAs to the new file PBAs; trimming the mapping of the old file LBAs to the old file PBAs; and clearing the mapping of the new file LBAs to the new file PBAs.

11 Claims, 4 Drawing Sheets

(56) References Cited

U.S. PATENT DOCUMENTS

| | | | |
|---|---|---|---|
| 8,515,912 B2 | 8/2013 | Garrod | |
| 8,572,311 B1* | 10/2013 | Shalvi | G06F 11/14 |
| | | | 711/103 |
| 9,164,700 B2* | 10/2015 | Hutton | G06F 3/0607 |
| 2006/0282644 A1* | 12/2006 | Wong | G06F 12/0246 |
| | | | 711/206 |
| 2009/0109788 A1* | 4/2009 | Moon | G06F 12/0246 |
| | | | 365/230.03 |
| 2010/0017558 A1* | 1/2010 | Fruin | G06F 3/0607 |
| | | | 711/103 |
| 2010/0095046 A1* | 4/2010 | Reid | G06F 12/0246 |
| | | | 711/102 |
| 2010/0125694 A1* | 5/2010 | Choi | G06F 12/0246 |
| | | | 711/1 |
| 2012/0151124 A1* | 6/2012 | Baek | G06F 12/0246 |
| | | | 711/103 |
| 2013/0212151 A1 | 8/2013 | Herbach | |
| 2014/0310499 A1 | 10/2014 | Sundararaman et al. | |

* cited by examiner

SWAT COMMAND AND API FOR ATOMIC SWAP AND TRIM OF LBAS

CROSS-REFERENCE TO RELATED APPLICATIONS

This application claims the benefit of provisional Patent Application Ser. No. 61/902,092, filed Nov. 8, 2013, assigned to the assignee of the present application, and incorporated herein by reference.

BACKGROUND

Document management systems update a data structure in order to track the most up-to-date version of documents. In this process, some systems create another version of document instead of overwriting the older version and keep the older version of document for a while. This allows the systems to concurrently access the older version of a document for reads while the new version is being updated. For example, if a user updates his/her blog page, other users can still read the old version of blog page while he/she is updating the blog page. At some points, the systems need to update the system information to access the new document and replace the old document. Typically, this triggers a series of cascaded updates in the data structure of the system and necessitates many writes to storage.

Accordingly, it would be desirable to provide an improved method and system for providing access to an updated file without having to perform cascaded updates in the data structures of the system.

BRIEF SUMMARY

Exemplary embodiments provide access to an updated file performed by a computer having at least one processor, wherein responsive to an application receiving an update comprising modified content of an old file, a new file is created into which the modified content is copied, while access to the old file is maintained, wherein old file logical block addresses (LBAs) are mapped to old file physical block addresses (PBAs), and new file LBAs are mapped to new file PBAs, the method, comprising: atomically swapping the mapping of the old file LBAs from the old file PBAs to the new file PBAs; trimming the mapping of the old file LBAs to the old file PBAs; and clearing the mapping of the new file LBAs to the new file PBAs.

According to the method and system of the exemplary embodiments, a file may be updated without having to perform cascaded updates in the data structures of the system and without unnecessary writes to storage.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
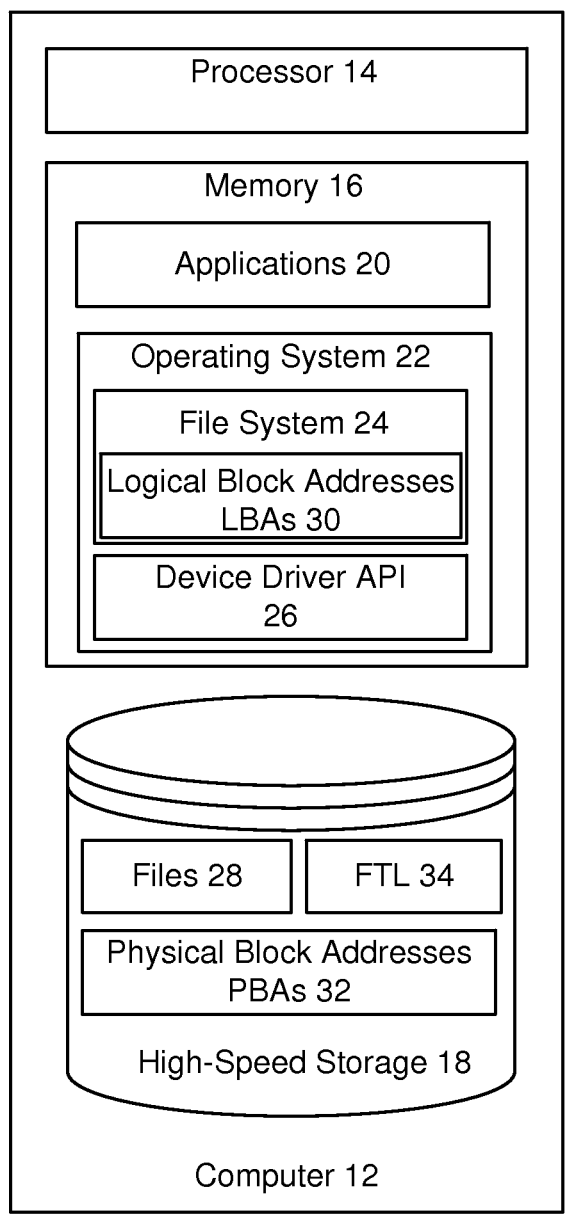
FIG. 1 is a block diagram illustrating a document management system in accordance with the exemplary embodiments.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

FIG. 1 is a block diagram illustrating a document management system 10 in accordance with the exemplary embodiments. The document management system 10 may comprise a computer 12 that tracks and stores electronic documents or files. In one embodiment, the computer 12 may comprise a desktop, laptop, or workstation, while in another embodiment, the computer 12 may comprise a server that communicates with a client computer over a network (not shown). The computer 12 may include typical computer components including a processor 14, a memory 16, and a storage device, such as high-speed storage 18 (e.g., solid state drive (SSD)).

The processor 14 may include multiple processors, or a single processor with one or more cores. The processor 14 executes program instructions from memory 16. Example types of software may include applications 20, on operating system 22, a file system 24, and a device driver application programming interface (API) 26 for the high-speed storage 18.

As is well known in the art, the applications 20 may represent computer software that when executed by the processor 14 causes a computer 12 to perform tasks beyond the running of the computer 12. Examples may include a web browser, a word processor and a database program. Typically, the applications 20 create and modify or update files 28. The operating system 22 is system software that manages and controls operation of the computer 12. Examples may include Microsoft Windows, Mac OS X and Linux.

The file system 24 is software that controls how information, such as the files 28, are stored, retrieved and updated on data storage devices, such as the high-speed storage 18. Typically, the file system 24 uses logical block addressing for specifying where data, such as the files 28, are stored on the high-speed storage 18 or other computer storage devices. More specifically, logical block addressing is an abstraction that assigns logical block addresses (LBAs) 30 to the files 28 that map to specific storage locations on the high speed storage 18.

The device driver application programming interface (API) 26 allows the applications 20, operating system 22, and file system 24 to transparently interact with the high-speed storage 18. The device driver API 26 provides commands to and/or receives data from high-speed storage 18.

In one embodiment, the high-speed storage 18 uses physical block addressing to provide addresses to each physical block of data stored on the high-speed storage 18. These types of addresses may be referred to as physical block addresses (PBAs) 32. In one embodiment, the high-speed storage 18 may comprise a solid-state drive (SSD) (also known as a solid-state disk). An SSD is a data storage device that uses integrated circuit assemblies as memory to persistently store data, such as files 28. In one embodiment, the SSD may use NAND-based flash memory or random-access memory (RAM).

In the embodiment, the high-speed storage 18 may further include a file translation layer (FTL) 34 or an equivalent that manages the high-speed storage 18 while providing a logical sector interface to the computer 12. As such, the FTL 34 controls the mapping between the LBAs 30 maintained by the file system 24 and the PBAs 32 maintained by the high-speed storage 18. In an alternative embodiment, the exemplary embodiments may be used with other types of storage devices other than an SSD.

Figure 2:
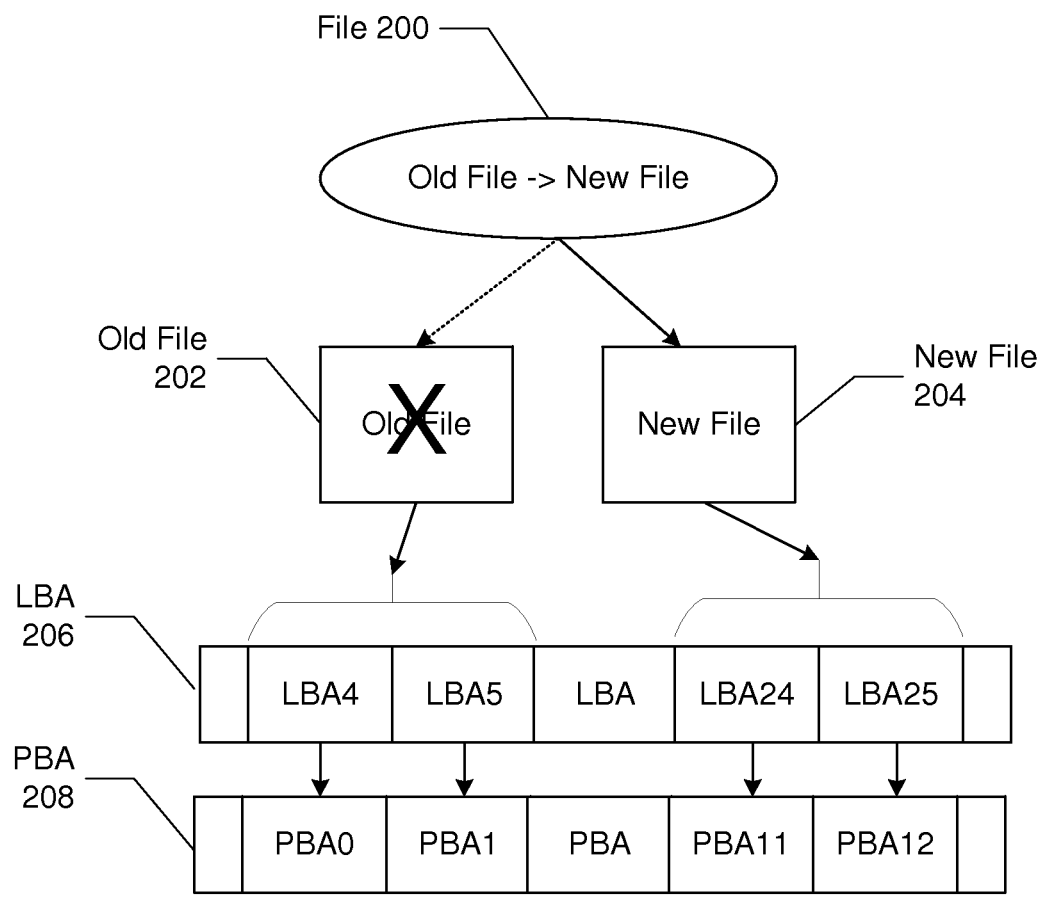
FIG. 2 is a graphical illustration of a conventional document management system updating a file.

FIG. 2 is a graphical illustration of a conventional document management system updating a file. The example shown assumes that an application maintains a file 200 that represents a blog page for user. Whenever the user updates the blog, the application reads the file 200 into memory, and modifies the content accordingly. During the update, the system creates a new file 204 into which the modified content is copied. Meanwhile, other users may still access and view the old file 200, while the user continues to update the blog. When the user finishes editing the blog and submits the page, the application switches to the new file 204 and deletes the old file 202.

The file system maintains the logical block addresses (LBA) 206 for the old file 202 and for the new file 204, while the storage system (where the files are actually stored) maintains physical block addresses (PBA) 208. In this example, the file system maps the old file 202 to LBA4 and LBA5, while the storage device maps LBA4-LBA5 to PBA0-PBA1, respectively. Similarly, the new file 204 is mapped to LBA24-LBA25, and LBA24-LBA25 are in turn mapped to PBA11-PBA12, respectively.

One problem with such conventional systems is that at some point the systems need to update system information to access the new file 204 that replaces the old file 202. Typically, this triggers a series of cascaded updates in data structure(s) of system and causes many writes to storage.

The system information may include metadata for each file/document. The metadata may, for example, include the date the document was stored and the identity of the user storing the file. The metadata is typically stored in a data structure. One example of such a data structure is a B-tree, which is a tree data structure that keeps data sorted and allows searches, sequential access, insertions, and deletions in logarithmic time. The list of LBAs 206 and/or metadata for each file 200 may be maintained by an inode in the B-tree. There is typically one inode per file 200. If the inode for the file 200 is stored near the leaf level of the B-tree, then all the nodes on a path from that node up to the root node may need to be updated, hence the cascading updates and writes to storage.

For example, whenever the user updates the blog described above, the application also needs to update the file information that contains the blog, which cause at least one disk write. With more users, more disk writes take place.

The exemplary embodiments are directed to an improved method and system for providing access to a new updated file without having to update system data structures, thereby minimizing or eliminating cascaded updates and excess disk writes in the system.

The exemplary embodiments propose a new storage (e.g., SSD) command and API to handle this problem. That is, if a new version of a document may be accessed without updating the system data structure, then storage writes may be avoided or reduced significantly due to the elimination of the cascaded updates to reflect the up-to-date system information. Actually, beyond this simplified example, many applications such as B+ trees, document logging, and others have such characteristics that the exemplary embodiment may be applied to.

The exemplary embodiments propose a command and an associated API referred to herein as a SWAT (SWap And Trim) command. Given a pair of LBA lists, the SWAT command atomically swaps the mapping of LBAs in the lists in the order and then trims the unused LBAs.

Figure 3:
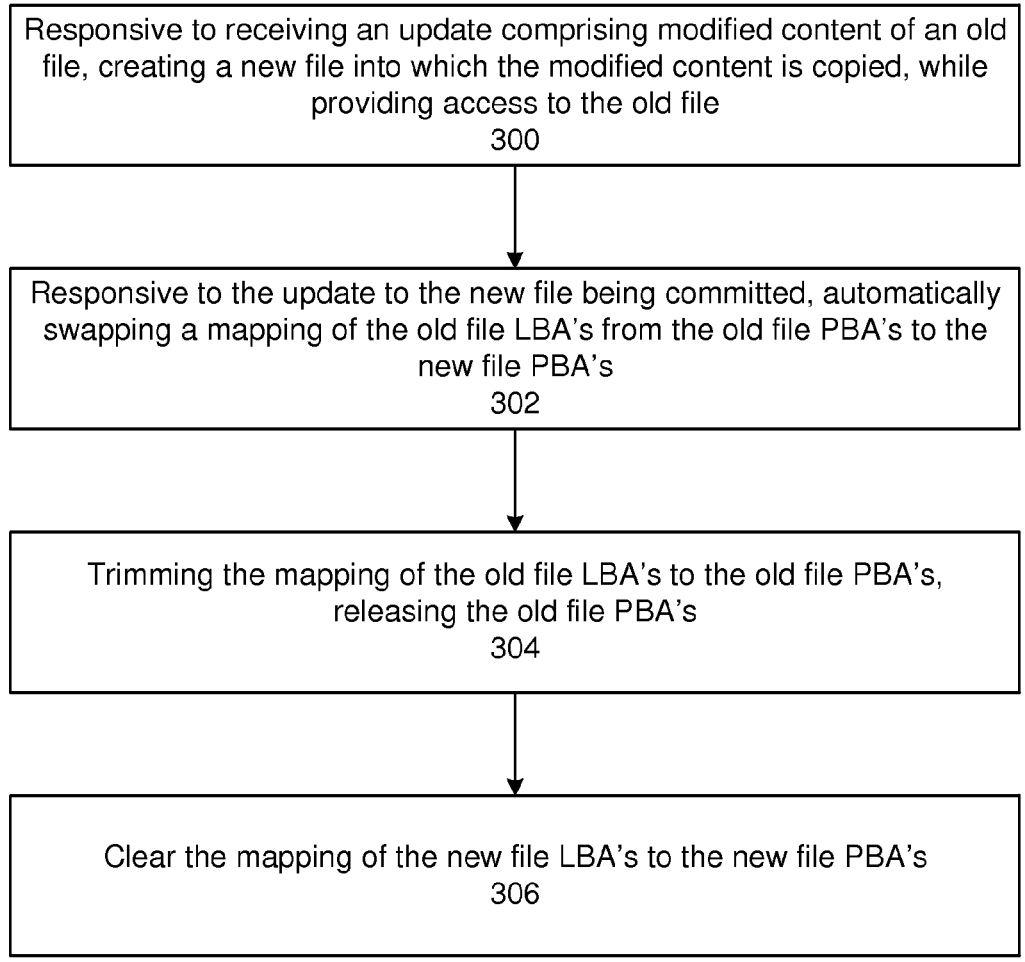
FIG. 3 is a flow diagram illustrating a process performed by the document management system for providing access to a file in during an update according to one exemplary embodiment.
Figure 4:
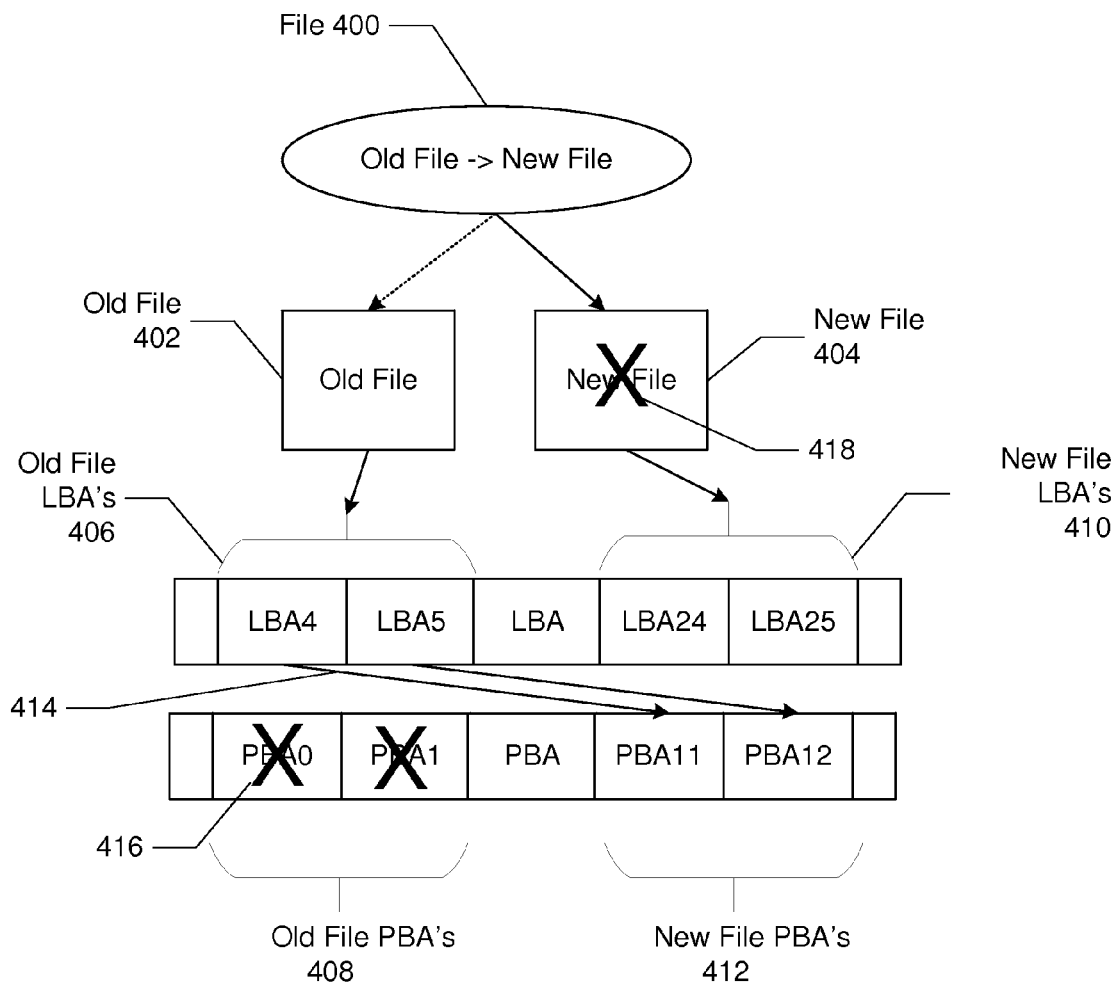
FIG. 4 is a diagram graphically illustrating the process shown in FIG. 3.

FIG. 3 is a flow diagram illustrating a process performed by the document management system 10 for providing access to a file during an update according to one exemplary embodiment; and FIG. 4 is a diagram graphically illustrating the process.

With reference to FIGS. 1, 3 and 4, the process may begin responsive to an application receiving an update comprising modified content of an old file, to create a new file into which the modified content is copied, while access to the old file is maintained (block 300).

This is illustrated in FIG. 4 showing that in response to a file 400 being updated, access to an old version of the file (i.e., old file) 402 is temporarily maintained and a new version of the file (i.e., new file) 404 is created containing the modified content. The file 400 may be updated through one of the applications 20 or alternatively, through the operating system 22.

The file system 24 represents the logical storage location of the old file 402 using a list of old file LBAs 406 (e.g., LBA4-LBA5), while the high-speed storage 18 represents the physical storage location using a list of old file PBAs 408 (e.g., PBA0-PBA1). Similarly, the logical storage location of the new file 404 is also represented using a list of new file LBAs 410 (e.g., LBA24-LBA25), while the physical storage location in high-speed storage 18 is represented using a list of new file PBAs 412 (e.g. PBA11-PBA12).

Referring again to FIG. 3, responsive to the update to the new file 404 being committed, a mapping of the old file LBAs 406 is atomically swapped from the old file PBAs 408 to the new file PBAs 412 (block 302). As shown in FIG. 4, the physical mapping of the list of old file LBAs 406 is remapped to the list of new file PBAs 412 of the new file 404. More specifically, once the SWAT command is issued, LBA4 is mapped to PBA11 and LBA5 is mapped to PBA12. Consequently, the SWAT API eliminates the need to update file information.

In addition, the mapping of the old file LBAs 406 to the old file PBAs 408 is trimmed, releasing the old file PBAs 408 (block 304). As shown in FIG. 4, after the trimming the old file PBAs 408 (PBA0 and PBA1) are released as shown by the "X's" 416.

The mapping of the new file LBAs 410 to the new file PBAs 412 is also cleared (block 306). As shown in FIG. 4, after the SWAT operation, the mapping for LBA24 and LBA25 are cleared and may be optionally recycled, and the new file 404 may be optionally deleted as shown by the "X" 418.

According to the exemplary embodiments, the SWAT command and API provide several advantages over existing techniques. The swap command does not require any modification to the OS, and may be applied to all types of SSD devices with a minor firmware modification. The SWAT command may also improve the endurance of SSD devices significantly by reducing the number of disk writes from the applications. The Swap command may also improve the performance of the system by proactively reclaiming unused space. In addition, the SWAT command may deliver significant performance benefits of applications, especially with multi-version concurrency control.

The following describes the SWAT command in further detail. Once the file is committed through the application 20, either the operating system 22 or the file system 24 makes a call to the device driver API 26. The device driver API 26 may then issue the SWAT command to the high-speed storage 18.

In one embodiment, the command may specify a pair of LBA lists—a list of new file LBAs 410 and a list of old file LBAs 406. The file translation layer (FTL) 34 in the high-speed storage 18 may receive the list of old file LBAs 406 and the list of new file LBAs 410 and atomically swap the mapping of LBAs in the pair of LBA lists in the order specified, and then trim the old file PBAs 408 in a best-effort manner (e.g., a batched trim to minimize trim overhead during execution of the SWAT command). In one, embodiment the SWAT command is atomic.

SWAT Command

In one embodiment, LBAs may be contiguous or non-contiguous. Accordingly, there may be two different SWAT commands for contiguous or non-contiguous LBAs. Aspects and embodiments of the SWAT commands will be better understood with reference to the following pseudo code in which the invention is described in terms of specific embodiments. These are provided for purposes of clarity and should not be taken to limit the invention. The invention and aspects thereof may have applications to a variety of types of methods, devices, and code not specifically disclosed herein.

API for Non-Contiguous LBAs swat (unsigned int *dst_list, unsigned int *src_list, unsigned int lba_count, unsigned int timeout)

This routine swaps the mapping of LBAs in dst_list with that of LBAs in src_list and trims the PBAs for the LBAs in dst_list atomically. Once this command is executed successfully, LBAs in the dst_list point to the PBAs pointed by LBAs in src_list, PBAs pointed by dst_list are trimmed, and LBAs in src_list are released. This API is useful when a large transaction needs to be handled atomically.

Parameters dst_list dst_list contains a listing of LBAs and points to the old content initially, but dst_list points to the new content after SWAT call is executed successfully. The contents (i.e., PBAs) of LBAs in dst_list are trimmed, and the mapping of LBAs is updated with the SWAT call.

src_list src_list points contains a listing of LBAs of the new content, and LBAs in src_list are released after the SWAT call is executed successfully. The contents (i.e., PBAs) of LBAs in src_list are kept, but the LBAs themselves may be optionally recycled.

lba_count The number of LBAs in both LBA list—the length of two lists must be the same and the maximum number of LBAs is implementation dependent, which may be defined by NVM_MAX_SWAT_LBA_COUNT.

timeout The maximum time in microsecond for the SWAT operation. If 0 is passed, it means infinite time.

RETURN NVM_SUCCESS: SWAT is successful

NVM_ERR_ROLLBACK: this error is returned when the device fails to conduct SWAT operation for some reasons, for example, because of media failure, time out, and others.

NVM_ERR_INVALID_LBA: this error is returned if LBAs in a list are not valid, for example, because a LBA is out of range of device or a LBA does not have mapping to any PBA.

NVM_ERR_INVALID_PARAM: this error is returned when some parameters of routine are not valid—for example, dst_list or src_list could be NULL, or lba_count could be 0 or ridiculously large by passing a negative value (e.g., −1) or type mismatch.

NVM_ERR_TIMEOUT: this error is returned when the device could not finish the operation within the time budget the user specifies.

Interface for Contiguous LBAs cont_swat (unsigned int dst_lba, unsigned int src_lba, unsigned int lba_count, unsigned int timeout)

The cont_swat routine swaps the mapping of LBAs in the range of (dst_lba, dst_lba+lba_count−1) with that of LBAs in the range of (src_lba, src_lba+lba_count−1) trims the PBAs for (dst_lba, dst_lba+lba_count−1) atomically. Once this command is executed successfully, LBAs for (dst_lba, dst_lba+lba_count−1) point to the PBAs pointed by LBAs for (src_lba, src_lba+lba_count−1); PBAs for (dst_lba, dst_lba+lba_count−1) are trimmed; and LBAs in (src_lba, src_lba+lba_count−1) are released.

Parameters dst_lba LBAs in the range of (dst_lba, dst_lba+lba_count−1) point to the old content initially, but point to the new content after cont_swat is executed successfully. The contents (i.e., PBAs) of LBAs in the range of (dst_lba, dst_lba+lba_count−1) are trimmed, and the mapping of LBAs in the range of (dst_lba, dst_lba+lba_count−1) is updated with the SWAT call src_lba src_lba points to the new content, and LBAs in the range of (src_lba, src_lba+lba_count−1) are released after nvm_cont_swat is executed successfully. The contents (i.e., PBAs) of LBAs in the range of (src_lba, src_lba+lba_count−1) remain but the LBAs themselves are recycled lba_count The number of LBAs in the both lists—the length of two lists must be the same and the maximum number of LBAs is implementation dependent, which may be defined by NVM_MAX_SWAT_LBA_COUNT.

timeout The maximum time in microsecond for SWAT operation. If 0 is passed, it means infinite time.

RETURN NVM_SUCCESS: SWAT is successful

NVM_ERR_ROLLBACK: this error is returned when the device fails to conduct SWAT operation for some reasons, for example, because of media failure, time out, and others.

NVM_ERR_INVALID_LBA: this error is returned if LBAs in a list are not valid, for example, because a LBA is out of range of device or a LBA does not have mapping to any PBA.

NVM_ERR_INVALID_PARAM: this error is returned when some parameters of routine are not valid—for example, dst_lba or src_lba could be out of range, or lba_count could be 0 or ridiculously large by passing a negative value (e.g., −1) or type mismatch.

NVM_ERR_TIMEOUT: this error is returned when the device could not finish the operation within the time budget the user specifies.

The SWAT command can be implemented in any type of storage protocol such as SATA, SAS, PCIe, eMMC, UFS, and the like through a vendor specific command.

The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A method of providing access to an updated file in a document management system comprising an application executing on a processor external to a storage device, wherein a file translation layer (FTL) map is maintained by an FTL between logical block addresses (LBAs) maintained by a file system and physical block addresses (PBAs) maintained by the storage device, the method comprising:

receiving by the storage device a first command from the processor, the first command sent responsive to the application receiving an update comprising modified content of a first file and creation of a second file into which the modified content is copied, while access to the first file is maintained, wherein first file LBAs are mapped to first file PBAs representing storage locations of the first file on the storage device, and second file LBAs are mapped to second file PBAs representing storage locations of the second file on the storage device, and wherein the first file LBAs are different than the second file LBAs, and the first file PBAs are different from the second file PBAs, wherein parameters of the first command include a pair of LBA lists corresponding to the first file LBAs and the second file LBAs;

atomically swapping the mapping of the first file LBAs from the first file PBAs to the second file PBAs in order, wherein mappings are created in the FTL map between the first file LBAs and the second file PBAs;

trimming the mapping of the first file LBAs to the first file PBAs, wherein mappings are removed in the FTL map between the first file LBAs and the first file PBAs; and clearing the mapping of the second file LBAs to the second file PBAs, wherein mappings are removed in the FTL map between the second file LBAs and the second file PBAs.

2. The method of claim 1, wherein the first command comprises a swap and trim (SWAT) command and is issued through an application programming interface (API).

3. The method of claim 2, wherein the SWAT command is issued from a storage device driver API to the storage device in response to a call made by an application or an operating system.

4. The method of claim 2, wherein the mapping of the LBAs in the first and second LBA lists are atomically swapped in an order specified by the lists and the first file PBAs are trimmed in a best-effort manner.

5. The method of claim 4, wherein the SWAT command comprises a first SWAT command for contiguous LBAs and a second SWAT command for non-contiguous LBAs.

6. A system, wherein a file translation layer (FTL) is maintained by an FTL between logical block addresses (LBAs) maintained by a file system and physical block addresses (PBAs) maintained by a storage device, the system comprising:

a computer comprising a processor and a memory, the processor executing at least one application; and the storage device external to the processor and the memory;

wherein the storage device is configured to:

receive a first command from the processor, the first command sent responsive to the application receiving an update comprising modified content of a first file and creation of a second file into which the modified content is copied, while access to the first file is maintained, wherein first file LBAs are mapped to first file PBAs representing storage locations of the first file on the storage device, and second file LBAs are mapped to second file PBAs representing storage locations of the second file on the storage device; and wherein the first file LBAs are different from the second file LBAs, and the first file PBAs are different from the second file PBAs, wherein parameters of the first command include a pair of LBA lists corresponding to the first file LBAs and the second file LBAs;

atomically swap the mapping of the first file LBAs from the first file PBAs to the second file PBAs in order, wherein mappings are created in the FTL map between the first file LBAs and the second file PBAs;

trim the mapping of the first file LBAs to the first file PBAs, wherein mappings are removed in the FTL map between the first file LBAs and the first file PBAs; and clear the mapping of the second file LBAs to the second file PBAs, wherein mappings are removed in the FTL map between the second file LBAs and the second file PBAs.

7. The system of claim 6, wherein the first command comprises a swap and trim (SWAT) command and is issued through an application programming interface (API).

8. The system of claim 7, wherein the SWAT command is issued from a storage device driver API to the storage device in response to a call made by an application or an operating system.

9. The system of claim 7, wherein the mapping of the LBAs in the first and second LBA lists are atomically swapped in an order specified by the lists and the first file PBAs are trimmed in a best-effort manner.

10. The system of claim 9, wherein the SWAT command comprises a first SWAT command for contiguous LBAs and a second SWAT command for non-contiguous LBAs.

11. An executable software product stored on a non-transitory computer-readable medium containing program instructions for providing access to an updated file in a document management system comprising an application executing on a processor external to a storage device, wherein a file translation layer (FTL) map is maintained by an FTL between logical block addresses (LBAs) maintained by a file system and physical block addresses (PBAs) maintained by the storage device, the program instructions for:

receiving by the storage device a first command from the processor, the first command sent responsive to the application receiving an update comprising modified content of an first file, creating a second file into which the modified content is copied, while access to the first file is maintained, wherein first file LBAs are mapped to first file PBAs representing storage locations of the first file on the storage device, and second file LBAs are mapped to second file PBAs representing storage locations of the second file on the storage device, wherein the first file LBAs are different from the second file LBAs, and the first file PBAs are different from the second file PBAs, wherein parameters of the first command include a pair of LBA lists corresponding to the first file LBAs and the second file LBAs;

atomically swapping the mapping of the first file LBAs from the first file PBAs to the second file PBAs in order, wherein mappings are created in the FTL map between the first file LBAs and the second file PBAs;

trimming the mapping of the first file LBAs to the first file PBAs, wherein mappings are removed in the FTL map between the first file LBAs and the first file PBAs; and clearing the mapping of the second file LBAs to the second file PBAs, wherein mappings are removed in the FTL map between the second file LBAs and the second file PBAs.

\* \* \* \* \*